(12) United States Patent
Guo et al.

(10) Patent No.: US 12,381,589 B2
(45) Date of Patent: Aug. 5, 2025

(54) SINGLE-SIDEBAND PHASE-SENSITIVE DETECTION METHOD AND SYSTEM

(71) Applicant: TSINGHUA UNIVERSITY, Beijing (CN)

(72) Inventors: Xingwei Guo, Shenzhen (CN); Shixue Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 19/072,899

(22) Filed: Mar. 6, 2025

(65) Prior Publication Data

US 2025/0202515 A1   Jun. 19, 2025

Related U.S. Application Data

(63) Continuation of application No. PCT/CN2023/106534, filed on Jul. 10, 2023.

(30) Foreign Application Priority Data

Sep. 6, 2022   (CN) .......................... 202211082749.6

(51) Int. Cl.
  *H04B 1/10*   (2006.01)
  *H04B 1/68*   (2006.01)
  *H04L 27/22*   (2006.01)

(52) U.S. Cl.
  CPC .............. *H04B 1/1027* (2013.01); *H04B 1/68* (2013.01); *H04L 27/22* (2013.01)

(58) Field of Classification Search
  CPC ...... H04B 1/1027; H04B 1/68; H04B 10/548; H04B 10/54; H04B 5/45; H04B 5/72;
  (Continued)

(56) References Cited

U.S. PATENT DOCUMENTS

| 4,328,590 A | * | 5/1982 | Lee ........................ H04B 10/54 |
| RE34,036 E | * | 8/1992 | McGeehan .............. H04B 1/68 |
| | | | 455/47 |

(Continued)

FOREIGN PATENT DOCUMENTS

| CN | 1992688 A | 7/2007 |
| CN | 107534633 A | 1/2018 |

(Continued)

*Primary Examiner* — Lana N Le

(57) ABSTRACT

A single-sideband phase-sensitive detection method is provided. A time-dependent target signal of a to-be-detected system is repeatedly triggered. A plurality of modulation signal sets varying in modulation phase corresponding to a plurality of triggering moments are generated. The time-dependent target signal is modulated based on the plurality of modulation signal sets corresponding to each of the triggering moments to obtain a plurality of detection signal sets varying in time and modulation phase. The plurality of detection signal sets are processed to obtain a plurality of equivalent single-sideband modulation signal sets. The plurality of equivalent single-sideband modulation signal sets are demodulated to obtain a plurality of processed signals. A single-sideband phase-sensitive detection system, device, storage medium and computer program product are also provided.

14 Claims, 14 Drawing Sheets

(58) Field of Classification Search
CPC ...... H04B 7/0682; H04B 10/677; H04B 1/04;
H04B 17/0085; H04B 10/613; H04B
10/588; H04B 10/556; H04L 27/22;
H04L 1/20; H04L 7/033; H04L 9/0858;
H04L 2209/34; H04L 1/205; H04L
27/362; H04L 27/103; H04L 27/36; H04L
27/14; H04L 27/2601; H04L 27/20; H04L
27/38; H04L 27/34; G01S 17/32; G01S
17/36; G01S 17/26; G01S 7/4863; H03C
3/0941; H03C 3/095; H03C 3/0933;
H03K 7/08
See application file for complete search history.

(56) References Cited

U.S. PATENT DOCUMENTS

| | | | |
|---|---|---|---|
| 10,348,345 B2* | 7/2019 | Guyton | H04B 1/1027 |
| 10,355,885 B2* | 7/2019 | Gävert | H04L 1/20 |
| 2010/0034318 A1 | 2/2010 | Lui et al. | |
| 2018/0227154 A1* | 8/2018 | Glattli | H04L 27/22 |

FOREIGN PATENT DOCUMENTS

| | | |
|---|---|---|
| CN | 109459733 A | 3/2019 |
| CN | 112152956 A | 12/2020 |

* cited by examiner

SINGLE-SIDEBAND PHASE-SENSITIVE DETECTION METHOD AND SYSTEM

CROSS-REFERENCE TO RELATED APPLICATIONS

This application is a continuation of International Patent Application No. PCT/CN2023/106534, filed on Jul. 10, 2023, which claims the benefit of priority from Chinese Patent Application No. 202211082749.6, filed on Sep. 6, 2022. The content of the aforementioned application, including any intervening amendments made thereto, is incorporated herein by reference in its entirety.

TECHNICAL FIELD

This application relates to signal processing and amplification, and more particularly to a single-sideband phase-sensitive detection method, system, device, computer-readable storage medium and computer program product.

BACKGROUND

The processing of weak signals plays a significant role in scientific research. For example, magnetic resonance signal detection, infrared signal detection and radar signal detection all belong to the field of weak signal processing that has drawn much attention.

The lock-in amplifier is an amplifier that performs phase-sensitive detection on weak signals. It can significantly suppress interference noise and improve the signal-to-noise ratio of the signal, and is an effective method for detecting weak signals. The frequency of the signal detected by the lock-in amplifier is commonly much lower than the modulation frequency of the lock-in amplifier. In the case where the detection signal contains a sudden change signal in a wide time domain and subsequent evolution, especially when the bandwidth of the changing signal is higher than the modulation frequency, the traditional lock-in amplification technique is incapable of providing a solution. Therefore, the detection of high-sensitivity signals in a wide time domain is highly challenging.

SUMMARY

An object of the disclosure is to provide a single-sideband phase-sensitive detection method, system, device, computer-readable storage medium and computer program product, so as to improve the sensitivity of weak wideband signal detection.

In order to achieve the above object, the following technical solutions are adopted.

In a first aspect, this application provides a single-sideband phase-sensitive detection method, comprising:
(1) repeatedly triggering a time-dependent target signal of a to-be-detected system, and generating a plurality of modulation signal sets varying in modulation phase corresponding to a plurality of triggering moments;
(2) modulating the time-dependent target signal based on the plurality of modulation signal sets corresponding to each of the triggering moments to obtain a plurality of detection signal sets varying in time and modulation phase;
(3) processing the plurality of detection signal sets to obtain a plurality of equivalent single-sideband modulation signal sets; and
(4) demodulating the plurality of equivalent single-sideband modulation signal sets to obtain a plurality of processed signals.

In a second aspect, this application provides a single-sideband phase-sensitive detection system, comprising:
a timing controller;
a signal collector; and a signal processor;
wherein the timing controller is configured to control a modulation signal or trigger a time-dependent target signal;
the signal collector is configured to acquire a plurality of detection signal sets varying in time and modulation phase obtained by modulating the time-dependent target signal after repeated triggering through the modulation signal; and
the signal processor is configured to receive the plurality of detection signal sets acquired by the signal collector, process the plurality of detection signal sets to obtain a plurality of equivalent single-sideband modulation signal sets, and demodulate the plurality of equivalent single-sideband modulation signal sets to obtain a plurality of processed signals.

In a third aspect, this application provides an electronic device, comprising:
at least one processor; and
a memory connected to the at least one processor in communication;
wherein the memory is configured to store an instruction executable by the at least one processor; and the at least one processor is configured to execute the instruction to implement the above single-sideband phase-sensitive detection method.

In a fourth aspect, this application provides a non-transitory computer-readable storage medium, wherein a computer instruction is stored on the non-transitory computer-readable storage medium; and the computer instruction is configured to be executed by a processor to implement the above single-sideband phase-sensitive detection method.

In a fifth aspect, this application provides a computer program product, comprising:
a computer program;
wherein the computer program is configured to be executed by a processor to implement the above single-sideband phase-sensitive detection method.

It should be understood that the description of this part is not intended to identify the key or important features of the embodiments of the present disclosure, and is not intended to limit the scope of the present disclosure. Other features of the present disclosure will be described below for ease of understanding.

BRIEF DESCRIPTION OF THE DRAWINGS

The accompanying drawings are used for explaining the technical solutions of the present disclosure, and are not intended to limit the scope of the present application.

DETAILED DESCRIPTION OF EMBODIMENTS

The technical solutions of the present disclosure will be clearly and completely described below in conjunction with the accompanying drawings and embodiments. Obviously, described below are only some embodiments of the present disclosure, instead of all embodiments of the present disclosure. Therefore, based on the embodiments in the present disclosure, various changes and modifications made by those of ordinary skill in the art without departing from the spirit of the disclosure shall fall within the scope of the disclosure defined by the appended claims.

Figure 1:
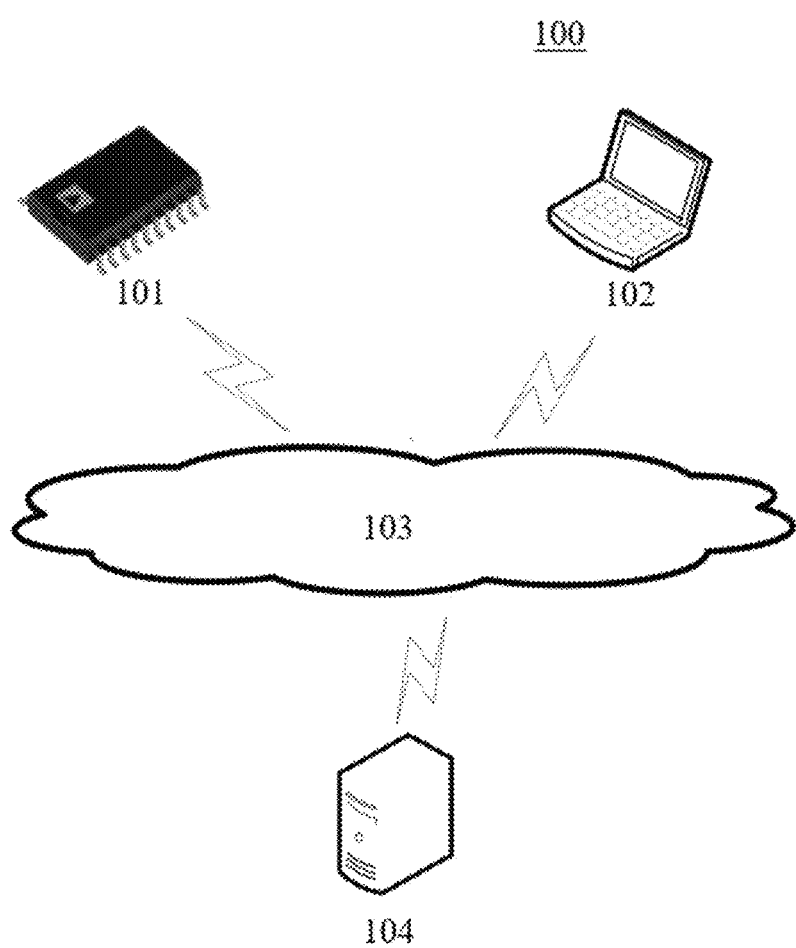
FIG. 1 is a schematic diagram of a system architecture for implementing a single-sideband phase-sensitive detection method in accordance with an embodiment of the present disclosure.

FIG. 1 shows a system architecture 100 for implementing a single-sideband phase-sensitive detection method provided herein.

As shown in FIG. 1, the system architecture 100 includes a first terminal device 101, a second terminal device 102, a network 103 and a server 104. The network 103 is configured to provide a medium for a communication link among the first terminal device 101, the second terminal device 102 and the server 104. The network 103 can include various types of connections, such as a wired or wireless communication link, or a fiber optic cable.

The first terminal device 101 and the second terminal device 102 can be used by a user to interact with the server 104 through the network 103, so as to obtain a detection signal. The first terminal device 101 and the second terminal device 102 are configured to control timing and collect analog signals, convert the analog signal into a digital signal through digital-to-analog converter, and then interact with the server 104 through the network 103.

The first terminal device 101 and the second terminal device 102 can be either hardware or software. The first terminal device 101 and the second terminal device 102 can be hardware, such as a signal acquisition device, a timing control device, an electronic device, including but not limited to a photoelectric signal sensor, a laptop computer and a desktop computer. The first terminal device 101 and the second terminal device 102 can be software installed in the above electronic devices. The first terminal device 101 and the second terminal device 102 can be implemented as multiple software items or software modules, or as a single software item or software module. No specific limitation is made herein.

The server 104 is capable of providing various signal-processing-based services. In some embodiments, the server 104 is configured to analyze and process a detection signal obtained from the terminal devices 101 and 102, and generate a processing result (e.g., determine a processed signal).

It should be noted that the server 104 can be either hardware or software. The server 104 can be hardware that can be implemented as a distributed server cluster consisting of multiple servers, or implemented as a single server. The server 104 can be software that can be implemented as multiple software items or software modules (for example, configured to provide distributed services), or implemented as a single software item or software module. No specific limitation is made herein.

It should be understood that the number of terminal devices, networks and servers in FIG. 1 is merely illustrative. Any number of terminal devices, networks and servers can be provided according to implementation requirements.

Figure 2:
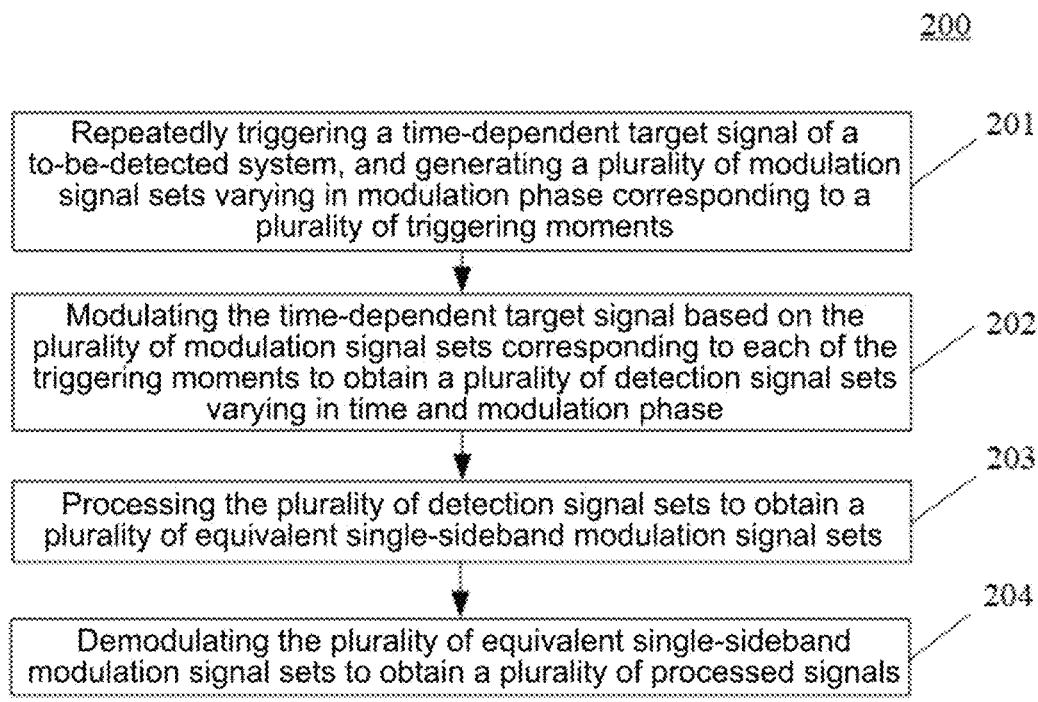
FIG. 2 is a flow chart of the single-sideband phase-sensitive detection method in accordance with an embodiment of the present disclosure.

In an embodiment, referring to FIG. 2, a process 200 of a single-sideband phase-sensitive detection method is provided, which includes the following steps.

Step (201) A time-dependent target signal of a to-be-detected system repeatedly triggered, and a modulation phase of a modulation signal at individual triggering moments is changed, i.e., a plurality of modulation signal sets varying in modulation phase corresponding to a plurality of triggering moments are generated.

In this embodiment, an execution subject of the single-sideband phase-sensitive detection method can repeatedly trigger the time-dependent target signal of the to-be-detected system and change the modulation phase of the modulation signal at each triggering moment. The target signal of the to-be-detected system can occur repeatedly. In some specific physical systems, the target signal is so weak that it cannot be directly detected, and must be modulated based on the plurality of modulation signal sets to be acquired. The target signal can be modulated multiple times based on the plurality of modulation signal sets. Specifically, the time when the target signal occurs can be controlled so that the target signal occurs repeatedly at each triggering moment, and the plurality of modulation signal sets corresponding to different triggering moments have different modulation phases. The modulation phase of the plurality of modulation signal sets at individual triggering moments can change according to a certain rule. In some embodiments, a difference between the modulation phases corresponding to two adjacent triggering moments is $\pi/2n$, where n is an integer. In some embodiments, the modulation phase at each triggering moment changes randomly within the entire cycle.

Step (202) The time-dependent target signal is modulated based on the plurality of modulation signal sets corresponding to each of the triggering moments to obtain a plurality of detection signal sets varying in time and modulation phase.

In this embodiment, the execution subject, after determining the trigger moments, can modulate the target signal triggered each time based on the plurality of modulation signal sets to obtain the plurality of detection signal sets varying in time and modulation phase. For example, the modulation of the target signal can be achieved by changing physical parameters such as voltage, current or magnetic field in the to-be-detected system. Specifically, based on the plurality of modulation signal sets at each trigger moment, the target signal occurring at a corresponding triggering moment can be modulated to obtain a detection signal set in correspondence with the corresponding triggering moment, thereby acquiring the plurality of detection signal sets. Since the plurality of modulation signal sets corresponding to different triggering moments have different modulation phases, the plurality of detection signal sets also have different modulation phases.

Step (203) The plurality of detection signal sets are processed to obtain a plurality of equivalent single-sideband modulation signal sets.

In this embodiment, the execution subject, after obtaining the plurality of detection signal sets, can perform post-processing on the plurality of detection signal sets to obtain the plurality of equivalent single-sideband modulation signal sets. Specifically, the plurality of detection signal sets can be subjected to high-pass filtering by any digital filter or hardware filter. That is, the frequency of the plurality of modulation signal sets is set as a frequency threshold, detection signal sets with frequencies less than the frequency threshold are filtered out from the plurality of detection signal sets, and detection signal sets with frequencies greater than or equal to the frequency threshold are retained to obtain a plurality of filtered signal sets. The plurality of filtered signal sets are determined as the plurality of equivalent single-sideband modulation signal sets.

There are various noise signals among the acquired detection signal sets. The 1/f noise, which is widely present in nature has a distribution where the lower the frequency, the greater the noise intensity. Therefore, in order to accurately detect the target signal, it is necessary to eliminate the noise signal among the plurality of detection signal sets, especially the low-frequency noise signals. The low-frequency noise signals refer to noise signals with frequencies lower than the modulation frequency, mainly including 1/f noise. The modulation frequency is a reference frequency of each of the plurality of modulation signal sets. Due to the modulation, the frequency of the target signal has been shifted to the vicinity of the modulation frequency, with a lower sideband signal and an upper sideband signal included. The lower sideband signal among the plurality of detection signal sets is suppressed, and the upper sideband signal is retained, which can remove noise and maintain a wide bandwidth.

Step (204) The plurality of equivalent single-sideband modulation signal sets are demodulated to obtain a plurality of processed signals.

In this embodiment, the above execution subject, after obtaining the plurality of equivalent single-sideband modulation signal sets, can demodulate the plurality of equivalent single-sideband modulation signal sets to obtain the plurality of processed signals. Specifically, a demodulation signal can be acquired, and the plurality of equivalent single-sideband modulation signal sets can be demodulated based on the demodulation signal to obtain a plurality of demodulated signal sets as the plurality of processed signals. The plurality of processed signals are configured as final output signals, which require to be transmitted to a host computer or terminal. It should be noted that the demodulation signal can be acquired either before step (201) or after at least one of steps (201)-(203), which is not limited in the present disclosure. The demodulation signal can be acquired by a signal acquisition device, or a signal can be simulated and generated as the demodulation signal on the basis of acquiring the frequency and phase of the plurality of modulation signal sets, which is not limited in the present disclosure. The demodulation signal has the same frequency and phase as the corresponding modulation signal.

In the single-sideband phase-sensitive detection method provided herein, the target signal of the to-be-detected system is first repeatedly triggered, and the modulation phase of the plurality of modulation signal sets at individual triggering moments is changed. Then, the target signal is modulated based on the plurality of modulation signal sets corresponding to each of the triggering moments to obtain the plurality of detection signal sets varying in time and modulation phase. Then, the plurality of detection signal sets are post-processed to obtain the plurality of equivalent single-sideband modulation signal sets. Finally, the plurality of equivalent single-sideband modulation signal sets are demodulated to obtain the plurality of processed signals. In this way, noise is removed by single-sideband filtering, which can remove most of the low-frequency noise among the plurality of detection signal sets, thereby improving the accuracy of the plurality of processed signals. In addition, the single-sideband filtering can retain the wide bandwidth in the plurality of detection signal sets, ensuring that a mutation signal among the plurality of detection signal sets is not distorted or deformed. The advantage of the above single-sideband phase-sensitive detection method is that the bandwidth of the target signal can be greater than that of the plurality of modulation signal sets.

Figure 3:
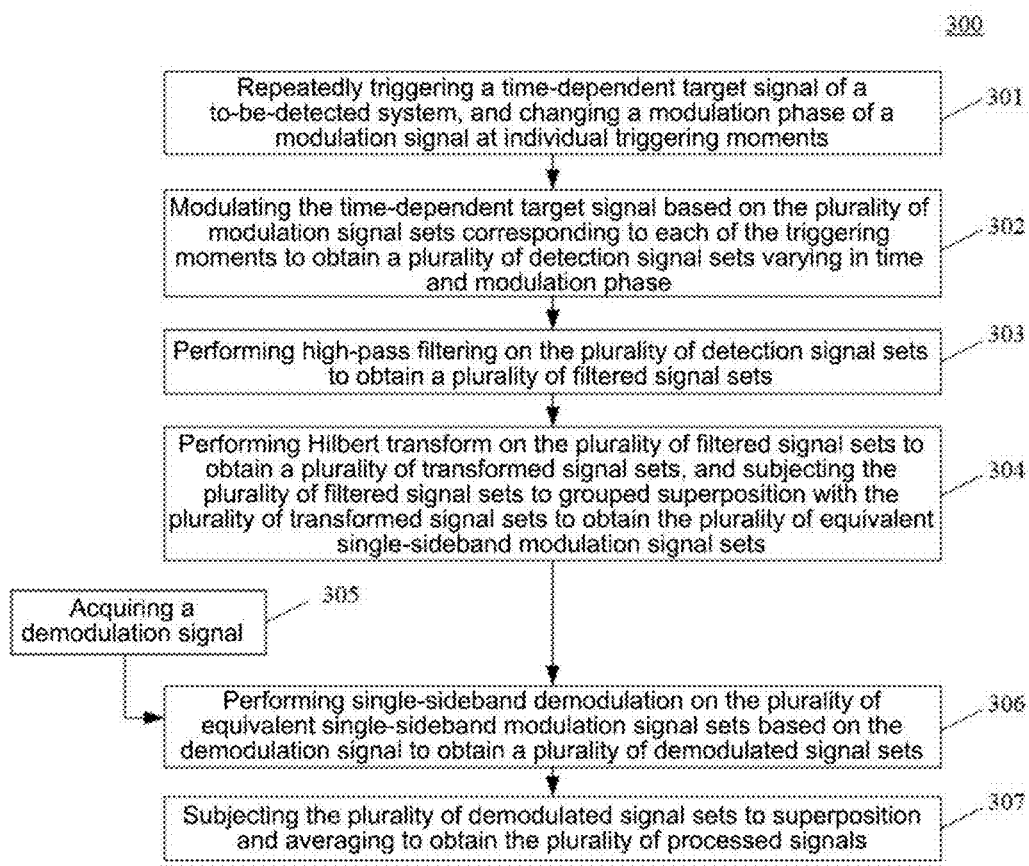
FIG. 3 is a flow chart of a single-sideband phase-sensitive detection method in accordance with another embodiment of the present disclosure.

In another embodiment, referring to FIG. 3, a process 300 of a single-sideband phase-sensitive detection method is provided, which includes the following steps.

Step (301) A time-dependent target signal of a to-be-detected system is repeatedly triggered, and a modulation phase of a modulation signal at individual triggering moments is changed, i.e., a plurality of modulation signal sets varying in modulation phase corresponding to a plurality of triggering moments are generated.

In this embodiment, the specific operation of step (301) has been described in detail in step (201) shown in FIG. 2, and will not be elaborated herein.

It should be noted that in some embodiments, continuous modulation signal sets can be acquired as the plurality of modulation signal sets. Based on an aliasing principle between the plurality of modulation signal sets and the trigger signal, a frequency of the trigger signal is determined. The time-dependent target signal of the to-be-detected system is repeatedly triggered by using the trigger signal to change the modulation phase of the plurality of modulation signal sets at individual triggering moments.

Figure 4A:
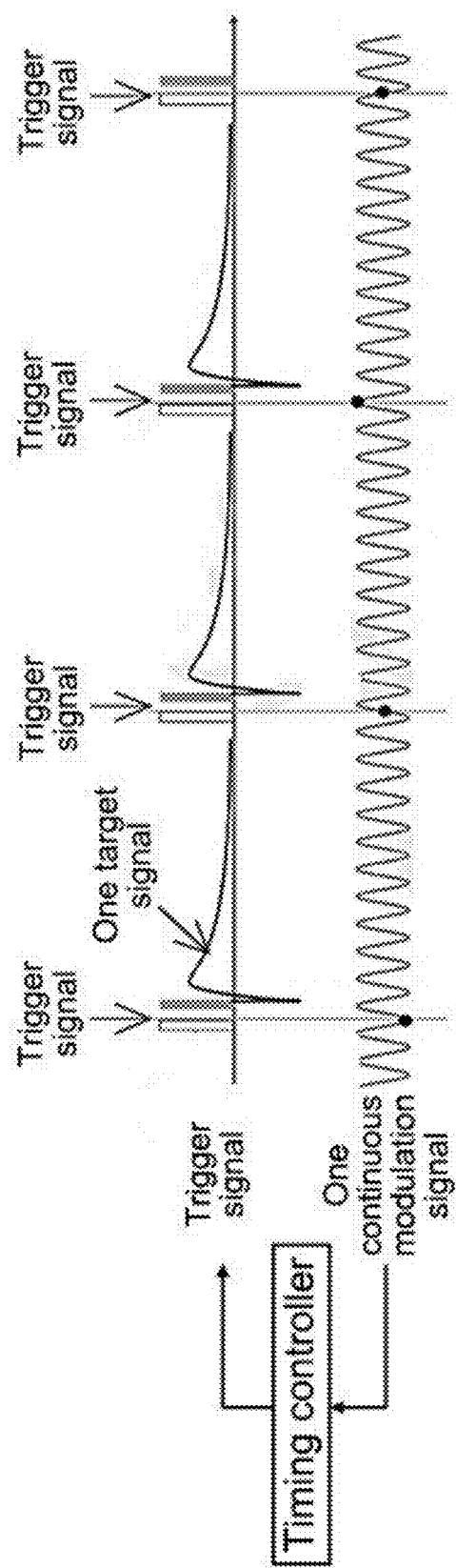
FIGS. 4a-b schematically show phase control of a detection signal in accordance with another embodiment of the present disclosure.
Figure 4B:
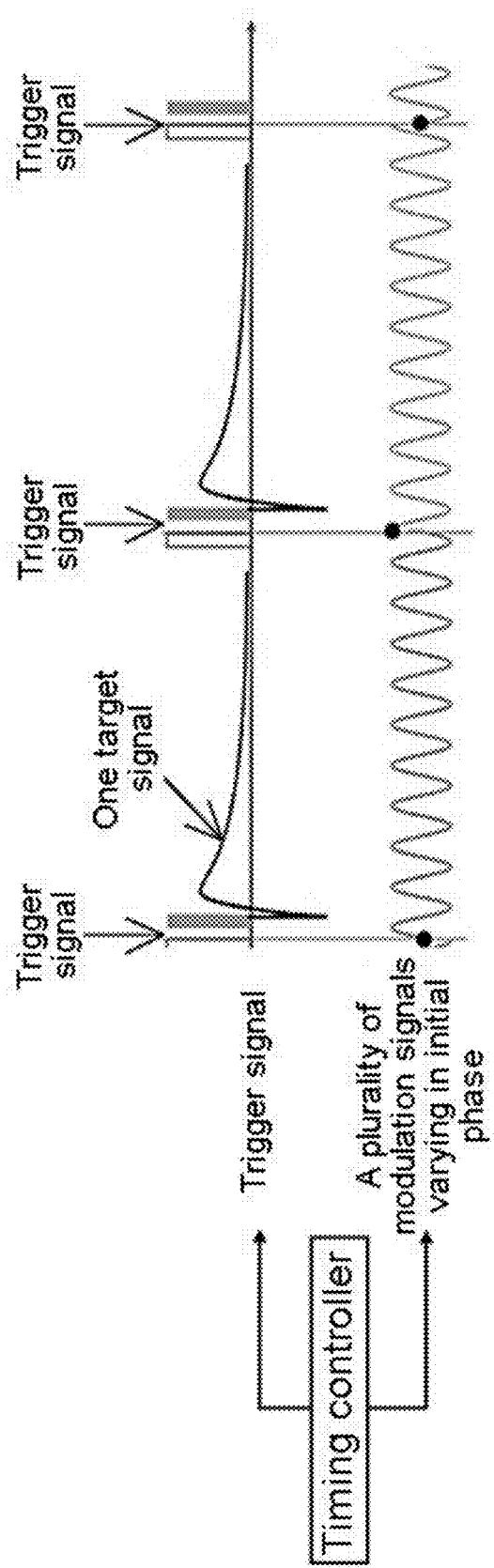

Specifically, FIGS. 4a-b show schematic diagrams of phase control of a detection signal of the present disclosure. As shown in FIG. 4a, a continuous modulation signal can be acquired, and the target signal of the to-be-detected system can occur repeatedly according to the frequency of the trigger signal. The generated target signals are repetitive and do not overlap with each other. Based on the aliasing principle between the plurality of modulation signal sets and the trigger signal, the occurrence frequency of the trigger signal can be determined, so that the target signal is repeatedly generated at different trigger moments, the plurality of modulation signal sets corresponding to different trigger moments different modulation phases, and the plurality of modulation signal sets are controlled to generate a plurality of modulation phases at multiple trigger moments. In this way, by virtue of the continuous modulation signal, the target signal can be repeatedly controlled to occur at different triggering moments, and the repeatedly occurring target signals can be modulated based on the continuous modulation signal to obtain a plurality of detection signal sets. Since the plurality of modulation signal sets corresponding to individual triggering moments have different modulation phases, the plurality of detection signal sets also have different initial phases.

In some embodiments, the trigger signal and the modulation signal of the target signal can be subjected to timing control so that the plurality of modulation signal sets corresponding to different triggering moments of the trigger signal have different modulation phases; and the target signal of the to-be-detected system is repeatedly triggered by using the trigger signal.

Specifically, referring to FIG. 4b, the trigger signal and the modulation signal of the target signal can be subjected to timing control to generate a plurality of modulation signal sets, so that each time the trigger signal occurs, the plurality of modulation signal sets have different modulation phases at different triggering moments, and are controlled to generate a plurality of modulation phases at the triggering moments, respectively. In this way, based on the plurality of modulation signal sets corresponding to the multiple triggering moments, the target signal occurring at the corresponding triggering moment can be modulated to obtain a set of detection signals, so as to obtain the plurality of detection signal sets. Since the plurality of modulation signal sets have different modulation phases, the plurality of detection signal sets also have different initial phases.

Step (302) The target signal is modulated based on the plurality of modulation signal sets corresponding to the plurality of triggering moments to obtain a plurality of detection signal sets varying in time and modulation phase.

In this embodiment, the specific operation of step (302) has been described in detail in step (202) shown in FIG. 2, and will not be elaborated herein.

It should be noted that the number of the plurality of detection signal sets is at least two. In a case where there are multiple detection signal sets, for each detection signal, there is another detection signal corresponding to it with a modulation-phase difference of $\pi/2$. In a case where there are only two detection signal sets, a phase difference between modulation signal sets at initial points of the two detection signal sets is $\pi/2$.

Step (303) The plurality of detection signal sets are subjected to high-pass filtering to obtain a plurality of filtered signal sets.

In this embodiment, the specific operation of step (303) has been described in detail in step (203) shown in FIG. 2, and will not be elaborated herein.

Step (304) The plurality of filtered signal sets are subjected to Hilbert transform to obtain a plurality of transformed signal sets. The plurality of filtered signal sets are subjected to grouped superposition with the plurality of transformed signal sets, so as to obtain the plurality of equivalent single-sideband modulation signal sets.

In this embodiment, the above execution subject, after obtaining the plurality of filtered signal sets, can perform Hilbert transform on the plurality of filtered signal sets to obtain the plurality of transformed signal sets, and perform grouped superposition of the plurality of filtered signal sets with the plurality of transformed signal sets to obtain the plurality of equivalent single-sideband modulation signal sets. Specifically, the target signal is a periodically varying signal that can be split into a sum of a plurality of cosine signals. Therefore, the target signal can be expressed in the form of the following Fourier expansion:

$$f_{kin}(t) = \sum_n a_n \cos(\omega_n t + \varphi_n)$$

In the above Fourier expansion, t represents time, $f_{kin}(t)$ represents the target signal consisting of a set of signals varying time, where n is a positive integer whose value does not exceed half of a sampling rate of the target signal, $a_n$ is an amplitude of the n-th cosine signal, $\omega_n$ is a frequency of the n-th cosine signal, and $\varphi_n$ is an initial phase of the n-th cosine signal.

Furthermore, $f_{kin}(t)$ is expanded to a complex space expressed as follows:

$$F_{kin}(t) = \Sigma_n a_n e^{i(\omega_n t + \varphi_n)}$$

In the above equation, $F_{kin}(t)$ is the target signal represented in the form of the complex space, and i is an imaginary number.

The plurality of modulation signal are each a periodically varying signal, which can be expressed in the form of a cosine signal as follows:

$$f_1(t) = \cos(\omega_{mod} t + \varphi_{mod}(k))$$

In the above equation, $f_1(t)$ represents the modulation signal, $\omega_{mod}$ is a frequency of the modulation signal, and $\varphi_{mod}(k)$ is an initial phase of the modulation signal.

Furthermore, $f_1(t)$ is expanded to a complex space expressed as follows:

$$F_1(t) = e^{i(\omega_{mod} t + \varphi_{mod}(k))}$$

In the above equation, $F_1(t)$ is the modulation signal represented in the form of the complex space, and i is an imaginary number.

When the modulation frequency is $\omega_{mod}$, an initial modulation phase of the k-th sampling in the sampling direction is $\varphi_{mod}(k)$, a linear modulation amplitude is b, and a single-sideband modulation signal can be obtained, which is expressed as follows:

$$F(t, k) = F_{kin}(t) * F_1(t) * b = \sum_n a_n * b * e^{i((\omega_n t + \varphi_n)} * e^{i(\omega_{mod} t + \phi_{mod}(k))}$$

In the above equation, F(t,k) is the single-sideband modulation signal represented in the form of the complex space, $F_{kin}(t)$ is the target signal represented in the form of the complex space, $F_1(t)$ is the modulation signal represented in the form of the complex space, and i is an imaginary number.

F(t,k) is expanded, and a real-part signal of F(t,k) can be expressed as follows:

$$f_{SBB}(t,k) = \Sigma_n a_n * b * [\cos(\omega_n t + \varphi_n) * \cos(\omega_{mod} t + \varphi_{mod}(k)) - \sin(\omega_n t + \varphi_n) * \sin(\omega_{mod} t + \varphi_{mod}(k))]$$

In the above equation, $f_{SBB}(t,k)$ is the real-part signal of the single-sideband modulation signal represented in the form of the complex space, and $\Sigma_n a_n * b * \cos(\omega_n t + \varphi_n) * \cos(\omega_{mod} \varphi_{mod}(k))$ is the signal actually detected after modulation without noise.

Noise will be introduced into the signal during transmission. Due to the influence of noise, the detection signal also contains a noise signal. The signal actually detected after modulation can also include the noise signal, which can be expressed as follows:

$$f_{det}(t, k) = \sum_n a_n * b * \cos(\omega_n t + \varphi_n) * \cos(\omega_{mod} t + \varphi_{mod}(k)) + f_{\frac{1}{f}noise}(t, k)$$

In the above equation, $f_{det}(t,k)$ is a noise-containing signal actually detected after modulation, i.e., the detection signal, and $$f_{\frac{1}{f}noise}(t,k)$$

is the noise signal. The detection signal is subjected to high-pass filtering to remove the main 1/f noise, and the remaining noise is mainly white noise. For the sake of clarity, the following expression does not include the white noise component. The equivalent single-sideband modulation signal can be constructed based on the filtered signal.

The plurality of filtered signal sets are subjected to Hilbert transform to obtain the plurality of transformed signal sets, where the Hilbert transform refers to performing Hilbert operation on the plurality of filtered signal sets. The purpose of this operation is to construct the part of the equivalent single-sideband modulation signal expressed as follows:

$$\sum_n -a_n \cdot b \cdot \sin(\omega_n t + \varphi_n) \cdot \sin(\omega_{mod} t + \varphi_{mod}(k) - \pi/2)$$

Signals of different sampling batches are selected from the plurality of filtered signal sets so that a phase difference between the selected signal and a modulation signal corresponding to the transformed signal is π/2. That is, a modulation phase of a filtered signal is $\varphi_{mod}(k')$, which has the following relationship with the modulation phase of the transformed signal $\varphi_{mod}(k)$: $\varphi_{mod}(k')=\varphi_{mod}(k)-\pi/2$. The purpose of this operation is to construct the following part of the equivalent single-sideband modulation signal:

$$\sum_n a_n \cdot b \cdot \cos(\omega_n t + \varphi_n) \cdot \cos(\omega_{mod} t + \varphi_{mod}(k) - \pi/2)$$

The filtered signal sets with a phase difference of π/2 are respectively superimposed on the transformed signal to obtain the plurality of equivalent single-sideband modulation signal sets, expressed as follows:

$$\sum_n a_n \cdot b \cdot \cos((\omega_n + \omega_{mod})t + \varphi_n + \varphi_{mod}(k) - \pi/2)$$

Figure 5A:
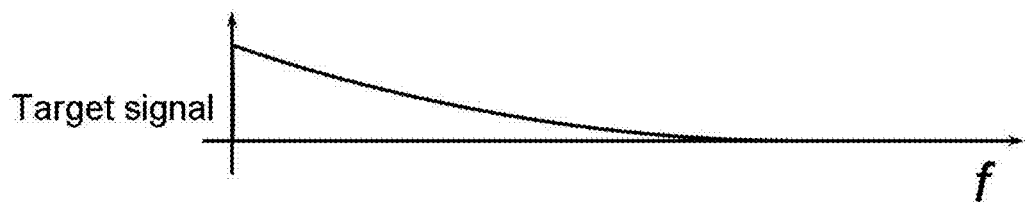
FIGS. 5a-d schematically show signal spectrums of the single-sideband phase-sensitive detection method in accordance with an embodiment of the present disclosure.
Figure 5B:
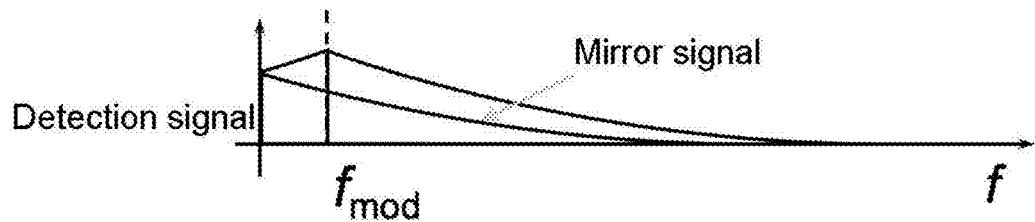
Figure 5C:
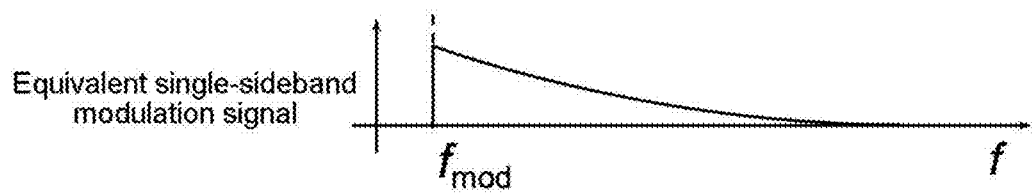
Figure 5D:
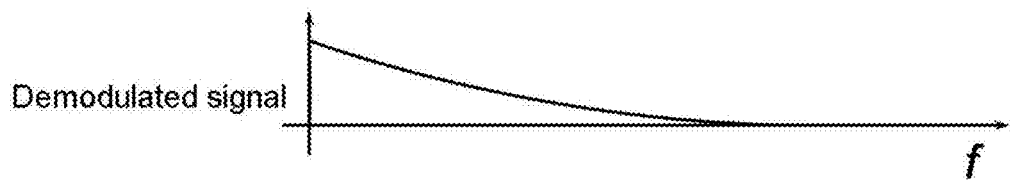

FIGS. 5a-d show signal spectrums of the single-sideband phase-sensitive detection method. FIG. 5a refers to the target signal. In some specific physical systems, the target signal is so weak that it cannot be detected directly and must be modulated based on the plurality of modulation signal sets to be acquired. FIG. 5b refers to the detection signal. The target signal of the to-be-detected system can be repeatedly triggered, and the modulation phase of the plurality of modulation signal sets at individual triggering moments is changed. The target signal triggered each time is modulated based on the plurality of modulation signal sets to obtain the plurality of detection signal sets varying in time and modulation phase. As shown in FIG. 5b, when the signal bandwidth of the time-dependent target signal is greater than twice the modulation frequency, an image signal will be generated in the detection signal. FIG. 5c refers to the equivalent single-sideband modulation signal. When the signal bandwidth of the time-dependent target signal is greater than twice the modulation frequency, an image signal will be generated in the detection signal. Therefore, the plurality of detection signal sets are subjected to high-pass filtering. The plurality of filtered signal sets cannot be determined as the plurality of equivalent single-sideband modulation signal sets. The plurality of filtered signal sets are subjected to Hilbert transform to obtain the plurality of transformed signal sets. The plurality of filtered signal sets are subjected to grouped superposition with the plurality of transformed signal sets, so as to obtain the strict equivalent single-sideband modulation signal sets. FIG. 5d refers to the demodulated signal. After obtaining the plurality of equivalent single-sideband modulation signal sets, single-sideband demodulation can be performed on the plurality of equivalent single-sideband modulation signal sets based on the demodulation signal to obtain a more accurate demodulated signal.

It should be noted that the plurality of detection signal sets can be subjected to high-pass filtering to obtain the plurality of filtered signal sets, then the plurality of filtered signal sets can be Hilbert transformed to obtain the plurality of transformed signal sets, and the plurality of filtered signal sets can be subjected to grouped superposition with the plurality of transformed signal sets to obtain the plurality of equivalent single-sideband modulation signal sets; the plurality of detection signal sets can also be subjected to Hilbert transform to obtain the plurality of transformed signal sets, then the plurality of detection signal sets can be subjected to grouped superposition with the plurality of transformed signal sets to obtain a plurality of superimposed signal sets, and then the plurality of superimposed signal sets can be subjected to high-pass filtering to obtain the plurality of equivalent single-sideband modulation signal sets. This is not limited in the present disclosure.

In some embodiments, in case of the signal bandwidth of the time-dependent target signal being less than twice the modulation frequency, the plurality of filtered signal sets can be determined as the plurality of equivalent single-sideband modulation signal sets.

Specifically, in a case where the signal bandwidth of the time-dependent target signal is less than twice the modulation frequency, the above execution subject, after obtaining the plurality of filtered signal sets, can perform Hilbert transform on the plurality of filtered signal sets to obtain the plurality of transformed signal sets, and perform grouped superposition on the plurality of filtered signal sets with the plurality of transformed signal sets to obtain the plurality of equivalent single-sideband modulation signal sets, or directly determine the plurality of filtered signal sets as the plurality of equivalent single-sideband modulation signal sets.

Step (305) The demodulation signal is acquired.

In this embodiment, the above execution subject can acquire the demodulation signal. It should be noted that the demodulation signal can be acquired either before step (301) or after at least one of steps (301)-(304), which is not limited in the present disclosure. The demodulation signal can be acquired by a signal acquisition device, or a signal can be simulated and generated as the demodulation signal on the basis of acquiring the frequency and phase of the plurality of modulation signal sets, which is not limited in the present disclosure. The demodulation signal has the same frequency and initial phase as the corresponding modulation signal.

Step (306) The plurality of equivalent single-sideband modulation signal sets is subjected to single-sideband demodulation based on the demodulation signal to obtain the plurality of demodulated signal sets.

In this embodiment, the above execution subject, after obtaining the demodulation signal, can perform demodulation on the plurality of equivalent single-sideband modulation signal sets based on the demodulation signal to obtain the plurality of demodulated signal sets.

In some embodiments, the plurality of equivalent single-sideband modulation signal sets can be subjected to filtering demodulation based on the demodulation signal to obtain the plurality of demodulated signal sets. Specifically, each of the plurality of equivalent single-sideband modulation signal sets is multiplied by the demodulation signal to obtain a plurality of first signal sets. The plurality of first signal sets are subjected to low-pass filtering in the sampling direction to obtain the plurality of demodulated signal sets.

Specifically, each of the plurality of equivalent single-sideband modulation signal sets can be multiplied by a corresponding demodulation signal having the same initial phase as it, where the plurality of equivalent single-sideband modulation signal sets have different initial phases. The plurality of first signal sets are subjected to low-pass filtering in the sampling direction, that is, the plurality of first signal sets are subjected to low-pass filtering at the same time point and different sampling times. The original filtering in the time-axis direction is replaced with the filtering in the sampling direction, so as to obtain signals with high time resolution.

The k-th equivalent single-sideband modulation signal set in the sampling direction is expressed as follows:

$$\sum_n a_n \cdot b \cdot \cos(\omega_n t + \varphi_n + \omega_{mod} t + \varphi_{mod}(k))$$

In the above expression, $a_n$ is an amplitude of the n-th cosine signal, $\omega_n$ is a frequency of the n-th cosine signal, $\varphi_n$ is an initial phase of the n-th cosine signal, b is a linear modulation amplitude, $\omega_{mod}$ is a frequency of the modulation signal, and $\varphi_{mod}(k)$ is an initial phase of the modulation signal.

Each of the plurality of equivalent single-sideband modulation signal sets can be multiplied by the demodulation signal, and the obtained k-th multiplied signal set is expressed as follows:

$$\sum_n a_n \cdot b \cdot \cos(\omega_n t + \varphi_n + \omega_{mod} t + \varphi_{mod}(k)) \cdot \cos(\omega_{mod} t + \varphi_{mod}(k)) =$$

$$\sum_n \frac{1}{2} a_n \cdot b \cdot [\cos(\omega_n t + \varphi_n + 2(\omega_{mod} t + \varphi_{mod}(k))) + \cos(\omega_n t + \varphi_n)]$$

In order to remove the influence of the periodic change of $\cos(\omega_n t + \varphi_n + 2(\omega_{mod} t + \varphi_{mod}(k)))$ with the sampling number k, the sampling direction, that is, the same time point and different sampling times satisfy $\Sigma_k \varphi_{mod}(k) = m\pi$, where m is an integer. The plurality of demodulated signal sets can be obtained by averaging or performing low-pass filtering in the sampling direction.

In some embodiments, the above execution subject can, after obtaining the plurality of first signal sets, can also perform low-pass filtering on the plurality of first signal sets in a time-axis direction in case of the signal bandwidth of the time-dependent target signal being less than twice the modulation frequency to obtain the plurality of demodulated signal sets.

Specifically, in the case where the signal bandwidth of the time-dependent target signal that is less than twice the modulation frequency, the above execution subject can, after obtaining the plurality of first signal sets, perform low-pass filtering in the sampling direction on the plurality of first signal sets to obtain the plurality of demodulated signal sets, or multiply each of the plurality of equivalent single-sideband modulation signal sets by the demodulation signal sets, and perform low-pass filtering in the time-axis direction on the plurality of first signal sets to obtain the plurality of demodulated signal sets, where the plurality of first signal sets can be low-pass filtered by any digital filter or hardware filter.

In some embodiments, the plurality of equivalent single-sideband modulation signal sets can be subjected to phase shifting demodulation based on the demodulation signal to obtain the plurality of demodulated signal sets. Specifically, each of the plurality of equivalent single-sideband modulation signal sets can be multiplied by the demodulation signal to obtain a plurality of second signal sets. The demodulation signal can be phase-shifted to obtain a phase-shifted demodulation signal. The plurality of equivalent single-sideband modulation signal sets are subjected to Hilbert transform to obtain a plurality of third signal sets. Each of the plurality of third signal sets is multiplied by the phase-shifted modulation signal to obtain a plurality of fourth signal sets. The plurality of second signal sets are superimposed with the plurality of fourth signal sets to obtain the plurality of demodulated signal sets.

The phase shifting demodulation includes the superposition of two signals, i.e., a product of the demodulation signal and the equivalent single-sideband modulation signal and a product of the demodulation signal after phase shifting π/2 and the Hilbert transformed signal of the equivalent single-sideband modulation signal.

Step (307) The plurality of demodulated signal sets are superimposed and averaged to obtain a plurality of processed signal sets.

In this embodiment, the above execution subject, after obtaining the plurality of demodulated signal sets, can perform superposition on the plurality of demodulated signal sets to obtain superimposed signal sets, and then perform averaging on the superimposed signal sets to obtain the plurality of processed signal sets. The superposition of the plurality of demodulated signal sets can effectively eliminate noise as the amount of data increases, thereby improving a signal-to-noise ratio of the processed signal sets.

After demodulating an equivalent single-sideband modulation signal, two signals can be obtained, one of which is a real-part signal as an I-channel signal, and the other of which is an imaginary-part signal as a Q-channel signal. After the above processing method, the I-channel signal can be obtained, which is configured as the processed signal. When the phase of the demodulation signal changes by π/2, the same processing will be performed to obtain the Q-channel signal. Phase correction can be applied in post-processing steps.

As shown in FIG. 3, compared with the embodiment corresponding to FIG. 2, the single-sideband phase-sensitive detection method in this embodiment has a stricter construction of the equivalent single-sideband modulation signal sets, which is applicable to all signal processing methods. Moreover, this method can remove noise while retaining the wide bandwidth of the signal.

Figure 6:
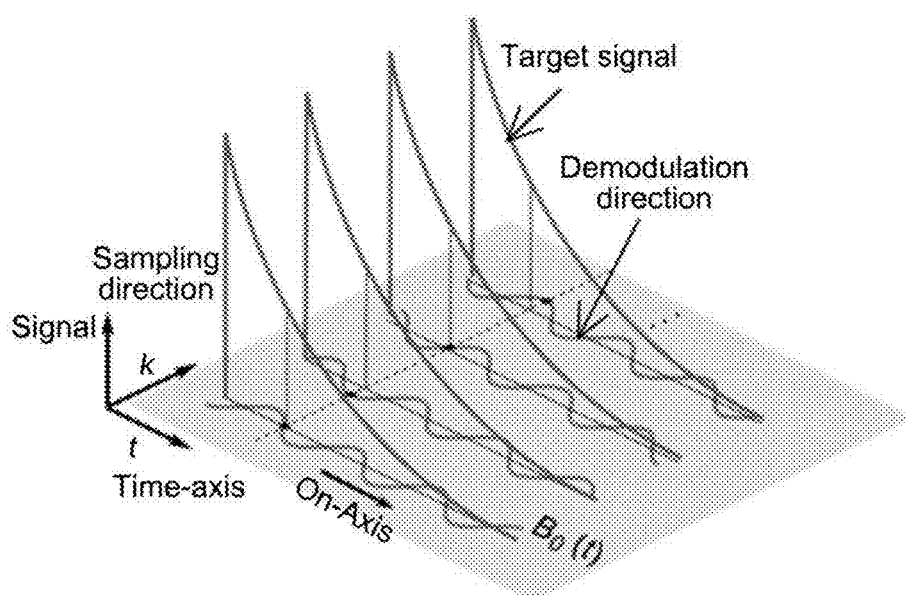
FIG. 6 is a schematic diagram of a processed signal obtained by the single-sideband phase-sensitive detection method in accordance with an embodiment of the present disclosure.

FIG. 6 shows a schematic diagram of acquiring the processed signal. As shown in FIG. 6, the plurality of detection signal sets varying in time and modulation phase are obtained based on the plurality of modulation signal sets with different initial phases. After the detection signal sets are processed to obtain the equivalent single-sideband modulation signal sets, the processed signals can be obtained after demodulation.

Figure 7:
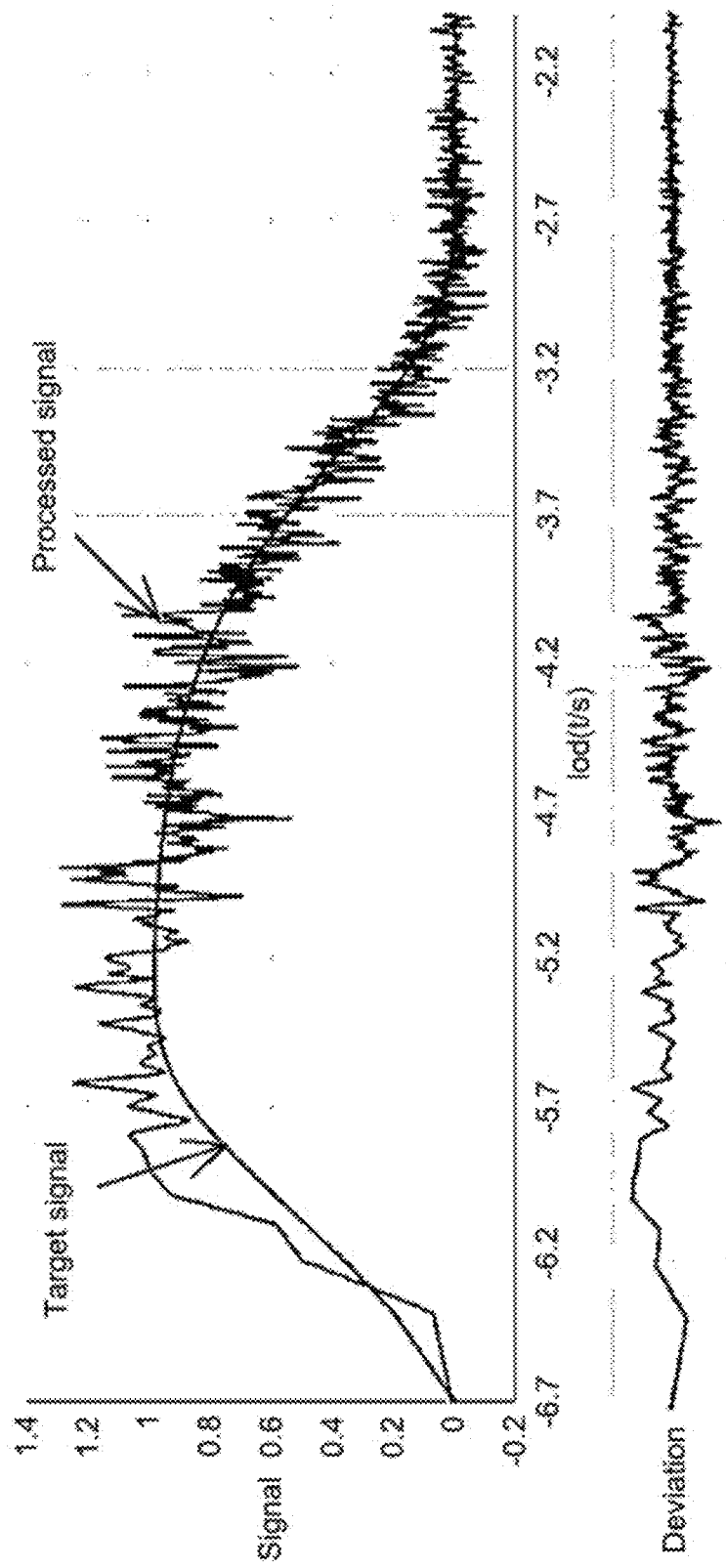
FIG. 7 is another schematic diagram of the processed signal obtained by the single-sideband phase-sensitive detection method in accordance with an embodiment of the present disclosure.
Figure 8:
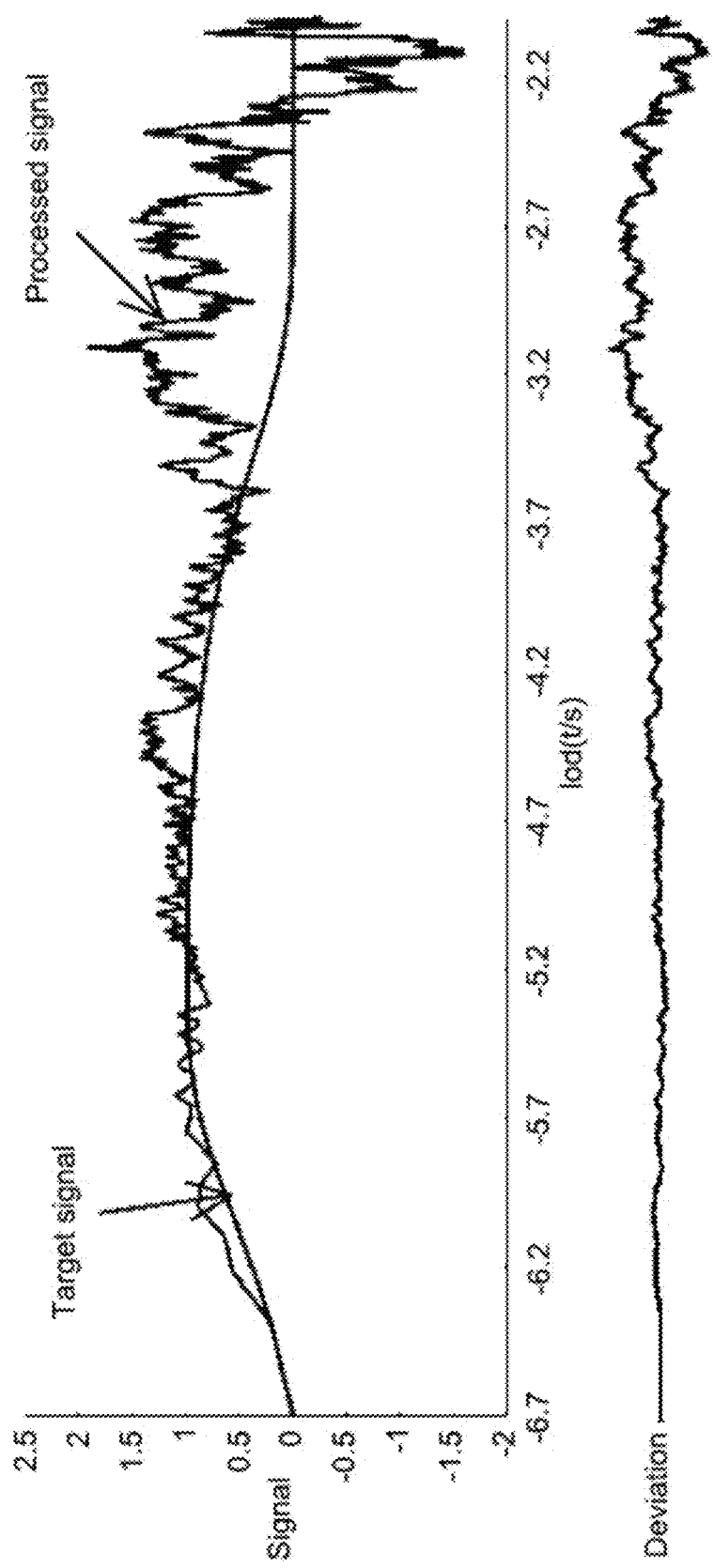
FIG. 8 is a schematic diagram of a processed signal obtained by a direct sampling method in the prior art.

FIG. 7 schematically shows a processed signal obtained by the above single-sideband phase-sensitive detection method. FIG. 8 schematically shows a processed signal obtained by a direct sampling method in the prior art. As shown in FIG. 7, the single-sideband phase-sensitive detection method in the present disclosure can effectively restore both high-frequency and low-frequency signals, thereby maintaining the wide bandwidth of the signal. As shown in FIG. 8, for the processed signal obtained by the direct sampling method in the prior art, the low-frequency signal is completely masked by the noise signal. It can be seen from FIGS. 7 and 8 that the single-sideband phase-sensitive detection method in the present disclosure can improve the accuracy of the processed signal, thus facilitating the acquisition of signals with high sensitivity and wide bandwidth.

Figure 9:
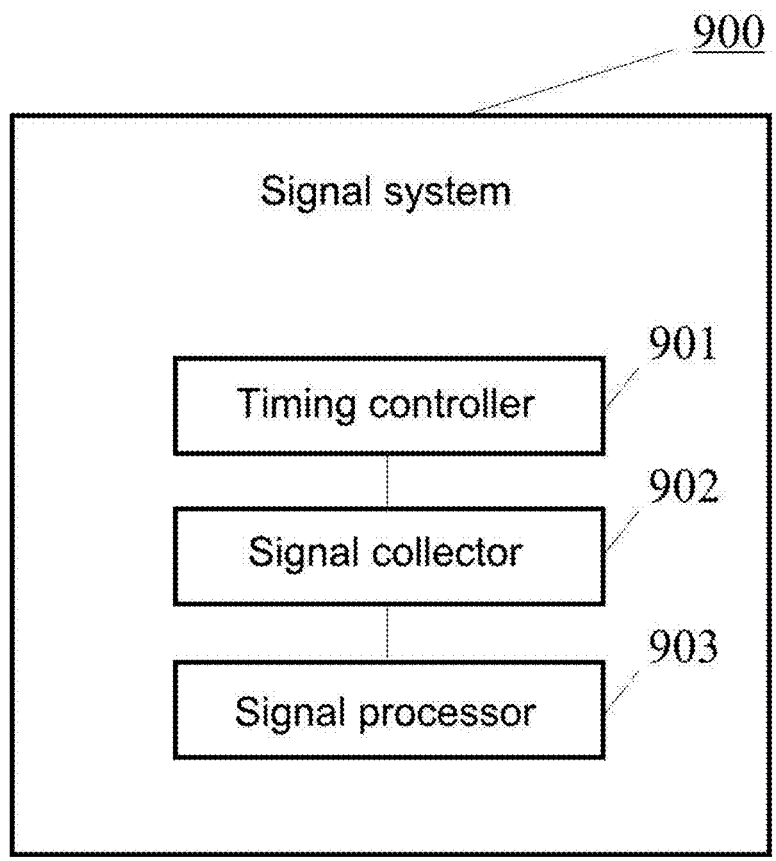
FIG. 9 is a structural diagram of a single-sideband phase-sensitive detection system in accordance with an embodiment of the present disclosure.

Further referring to FIG. 9, a single-sideband phase-sensitive detection system 900 for implementing the single-sideband phase-sensitive detection method shown in FIG. 2 is provided.

As shown in FIG. 9, the single-sideband phase-sensitive detection system 900 includes a timing controller 901, a signal collector 902 and a signal processor 903. The timing controller 901 is configured to control a modulation signal or trigger a time-dependent target signal. The signal collector 902 is configured to acquire a plurality of detection signal sets varying in time and modulation phase obtained by modulating the time-dependent target signal after repeated triggering through the modulation signal. The signal processor 903 is configured to receive the plurality of detection signal sets acquired by the signal collector 902, process the plurality of detection signal sets to obtain a plurality of equivalent single-sideband modulation signal sets, and demodulate the plurality of equivalent single-sideband modulation signal sets to obtain a plurality of processed signals.

In this embodiment, the specific processing of the timing controller 901, the signal collector 902 and the signal processor 903, as well as the resulting technical effects, can be referred to the relevant descriptions in the embodiment shown in FIG. 2, which will not be repeated herein.

In some embodiments, the signal collector 902 can acquire a continuous modulation signal, determine a frequency of a trigger signal based on an aliasing principle between the plurality of modulation signal sets and the trigger signal, and repeatedly trigger the time-dependent target signal of the to-be-detected system by using the trigger signal to change the modulation phase of the plurality of modulation signal sets at individual triggering moments. In some embodiments, the signal collector 902 can perform timing control on a trigger signal of the target signal and the plurality of modulation signal sets so that the plurality of modulation signal sets corresponding to individual triggering moments of the trigger signal have different modulation phases, and repeatedly trigger the target signal of the to-be-detected system by using the trigger signal. The target signal is modulated based on the plurality of modulation signal sets corresponding to each of the triggering moments to obtain a plurality of detection signal sets varying in time and modulation phase.

In some embodiments, the signal processor 903 can perform high-pass filtering on the plurality of detection signal sets to obtain a plurality of filtered signal sets, perform Hilbert transform on the plurality of filtered signal sets to obtain a plurality of transformed signal sets, and allow the plurality of filtered signal sets to undergo grouped superposition with the plurality of transformed signal sets to obtain the plurality of equivalent single-sideband modulation signal sets. According to the application scenario, if the signal bandwidth of the time-dependent target signal is less than twice the modulation frequency, either the Hilbert transform can be performed on the plurality of filtered signal sets to obtain the plurality of transformed signal sets, and then the plurality of filtered signal sets are subjected to grouped superposition with the plurality of transformed signal sets to obtain the plurality of equivalent single-sideband modulation signal sets; or the plurality of filtered signal sets can be directly determined as the plurality of equivalent single-sideband modulation signal sets. The demodulation signal is acquired. The single-sideband demodulation is performed on the plurality of equivalent single-sideband modulation signal sets based on the demodulation signal to obtain a plurality of demodulated signal sets. The plurality of demodulated signal sets are subjected to superposition and averaging to obtain the plurality of processed signals.

In some embodiments, the signal processor 903 can perform filtering demodulation on the plurality of equivalent single-sideband modulation signal sets based on the demodulation signal to obtain the plurality of demodulated signal sets. Specifically, the signal processor 903 can multiply each of the plurality of equivalent single-sideband modulation signal sets by the demodulation signal to obtain a plurality of multiplied signal sets, and perform low-pass filtering on the plurality of multiplied signal sets in a sampling direction to obtain the plurality of demodulated signal sets. According to the application scenario, if the signal bandwidth of the time-dependent target signal is less than twice the modulation frequency, either the plurality of multiplied signal sets can be subjected to low-pass filtering in a sampling direction to obtain the plurality of demodulated signal sets; or the plurality of multiplied signal sets can be subjected to low-pass filtering in a time-axis direction to obtain the plurality of demodulated signal sets. In some embodiments, phase shifting demodulation is performed on the plurality of equivalent single-sideband modulation signal sets based on the demodulation signal to obtain the plurality of demodulated signal sets. Specifically, the signal processor 903 can multiply each of the plurality of equivalent single-sideband modulation signal sets by the demodulation signal to obtain a plurality of first signal sets, perform phase shift on the demodulation signal to obtain a phase-shifted demodulation signal, perform Hilbert transform on the plurality of equivalent single-sideband modulation signal sets to obtain a plurality of second signal sets, multiply the phase-shifted demodulation signal with each of the plurality of second signal sets to obtain a plurality of third signal sets, and superimpose the plurality of first signal sets with the plurality of third signal sets to obtain the plurality of demodulated signal sets.

An electronic device, a non-transitory computer-readable storage medium and a computer program product are also provided.

Figure 10:
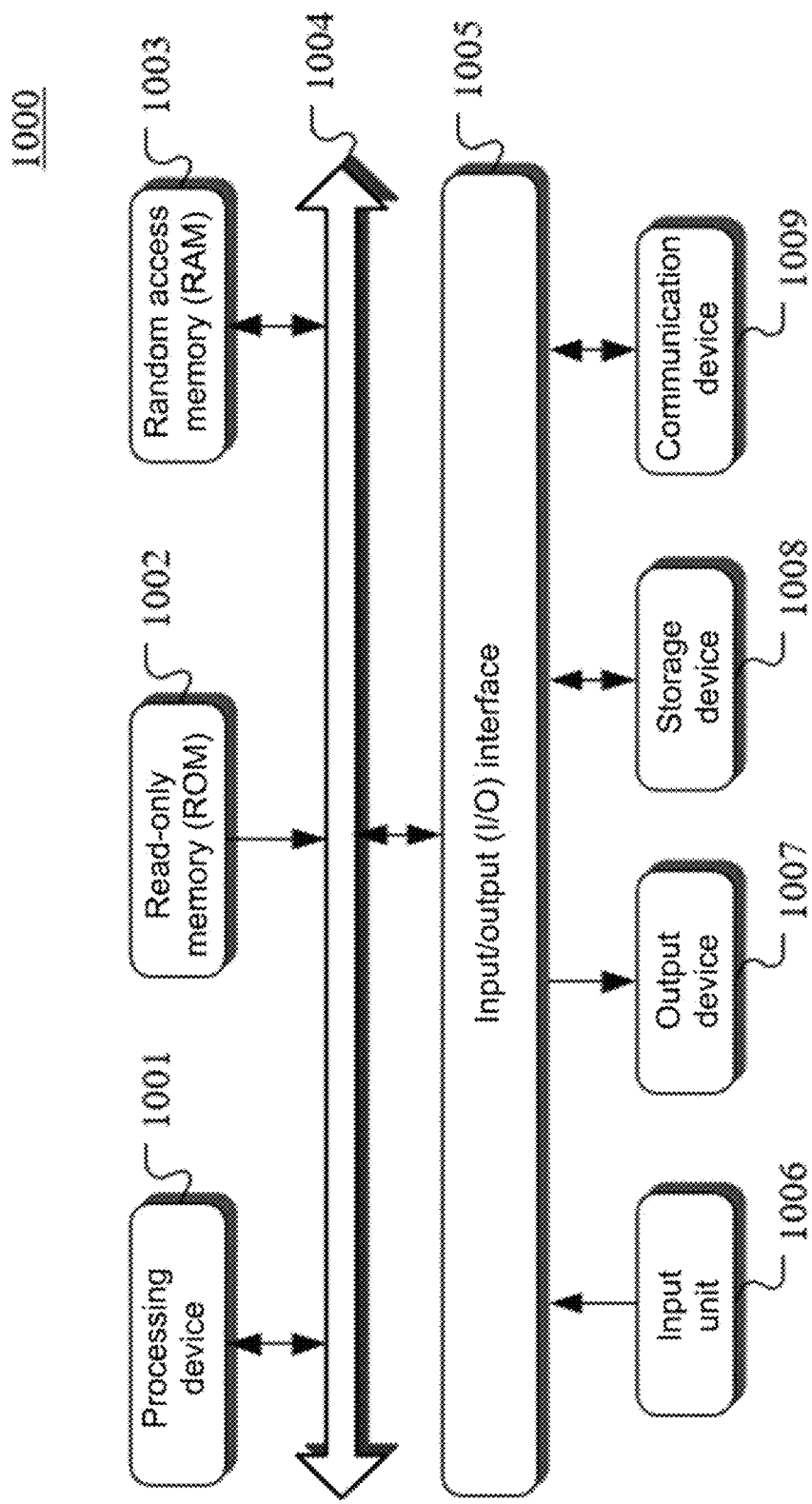
FIG. 10 is a block diagram of an electronic device for implementing the single-sideband phase-sensitive detection method in accordance with an embodiment of the present disclosure.

FIG. 10 shows a block diagram of the electronic device 1000 for implementing the above single-sideband phase-sensitive detection method. The electronic device is intended to represent various forms of digital computers, such as laptop computers, desktop computers, workstations, servers, blade servers, mainframe computers and other suitable computers. The electronic device can also represent a signal acquisition device, such as a signal generator, a digital-to-analog converter and other similar device. The components shown herein, their connections and relationships, as well as their functions, are merely illustrative, and are not intended to limit the implementation of the present disclosure.

As shown in FIG. 10, the electronic device 1000 includes a computing unit 1001, which can perform various appropriate actions and processes according to a computer program stored in a read-only memory (ROM) 1002 or a computer program loaded from a storage unit 1008 into a random access memory (RAM) 1003. Various programs and data required for the operation of the electronic device 1000 can also be stored in the RAM 1003. The computing unit 1001, the ROM 1002 and the RAM 1003 are connected to each other via a bus 1004. An input/output (I/O) interface 1005 is also connected to the bus 1004.

Multiple components in the electronic device 1000 are connected to the I/O interface 1005. The plurality of components include an input unit 1006, such as a keyboard, a mouse, a signal collector or a signal receiver; an output unit 1007, such as a display and a speaker; the storage unit 1008, such as a disk and an optical disk; and a communication unit 1009, such as a network card. The communication unit 1009 is configured to allow the electronic device 1000 to exchange information/data with other devices through a computer network such as the Internet and/or various telecommunication networks.

The computing unit 1001 can be various general and/or special processing components with processing and computing capabilities. In some embodiments, the computing unit 1001 includes, but is not limited to, a digital signal processor (DSP), as well as any appropriate processor, controller and microcontroller. The computing unit 1001 is configured to perform the methods and processes described above, such as performing single-sideband filtering on the plurality of detection signal sets to obtain the plurality of equivalent single-sideband modulation signal sets, and demodulating the plurality of equivalent single-sideband modulation signal sets to obtain the plurality of processed signals. For example, in some embodiments, the method of performing single-sideband filtering on the plurality of detection signal sets to obtain the plurality of equivalent single-sideband modulation signal sets, and demodulating the plurality of equivalent single-sideband modulation signal sets to obtain the plurality of processed signals can be implemented as a computer software program, which is tangibly contained in a machine-readable medium, such as the storage unit 1008. In some embodiments, part or all of the computer program can be loaded and/or installed on the electronic device 1000 via the ROM 1002 and/or the communication unit 1009. When the computer program is loaded into the RAM 1003 and executed by the computing unit 1001, one or more steps of performing single-sideband filtering on the plurality of detection signal sets to obtain the plurality of equivalent single-sideband modulation signal sets, and demodulating the plurality of equivalent single-sideband modulation signal sets to obtain the plurality of processed signals can be performed.

The embodiments of the systems and techniques described above can be implemented in digital electronic circuit systems, integrated circuit systems, application specific integrated circuits (ASICs), computer hardware, firmware, software, and/or combinations thereof. These embodiments can include implementation in one or more computer programs that are executable and/or interpretable on a programmable system including at least one programmable processor. The least one programmable processor can be a special-purpose or general-purpose programmable processor that is capable of receiving data and instructions from a storage system, at least one input device and at least one output device, and transmit data and instructions to the storage system, the at least one input device and the at least one output device.

The program code for implementing the method of the present disclosure can be written using any combination of one or more programming languages. These program codes can be provided to a processor or controller of a general-purpose computer, a special-purpose computer or other programmable data processing device, such that when the program code is executed by the processor or controller, the functions/operations specified in the flowchart and/or block diagram are implemented. The program code can be executed entirely on the machine, partially on the machine as a stand-alone software package and partially on a remote machine, or entirely on a remote machine or server.

In the present disclosure, the machine-readable medium can be a tangible medium that can contain or store a program for use by or in conjunction with an instruction execution system, apparatus or device. The machine-readable medium can be a machine-readable signal medium or a machine-readable storage medium. In some embodiments, the machine-readable storage medium can include electrical connections based on one or more lines, a portable computer disk, a hard disk, a RAM, a ROM or any suitable combination of the foregoing.

In order to provide interaction with a user, the systems and techniques described herein can be implemented on a computer having a display device for displaying information to the user and a keyboard and a pointing device (e.g., a mouse) through which the user can input information into the computer.

The computer system can include a client and a server. The client and the server are generally remote from each other and usually interact through a communication network. A relationship between the client and the server is generated by a computer program running on the respective computer and having a client-server relationship with each other.

It should be understood that the steps in the processes shown above can be reordered, added or deleted. For example, the steps in the present disclosure can be executed in parallel, sequentially or in different orders, as long as the desired results of the technical solutions of the present disclosure can be achieved, which is not limited herein.

The embodiments described above are merely illustrative of the present application, and are not intended to limit the scope of the present application. It should be understood that various modifications, combinations and substitutions obtained by those of ordinary skill in the art without departing from the spirit of the disclosure shall fall within the scope of the disclosure defined by the appended claims.

What is claimed is:

1. A single-sideband phase-sensitive detection method, comprising:
   (1) repeatedly triggering a time-dependent target signal of a to-be-detected system, and generating a plurality of modulation signal sets varying in modulation phase corresponding to a plurality of triggering moments;
   (2) modulating the time-dependent target signal based on the plurality of modulation signal sets corresponding to each of the triggering moments to obtain a plurality of detection signal sets varying in time and modulation phase;

(3) processing the plurality of detection signal sets to obtain a plurality of equivalent single-sideband modulation signal sets; and (4) demodulating the plurality of equivalent single-sideband modulation signal sets to obtain a plurality of processed signals.

2. The single-sideband phase-sensitive detection method of claim 1, wherein step (1) comprises:

acquiring the plurality of modulation signal sets, wherein the plurality of modulation signal sets are each a continuous modulation signal set;

determining a frequency of a trigger signal based on an aliasing principle between a corresponding one of the plurality of modulation signal sets and the trigger signal; and repeatedly triggering the time-dependent target signal of the to-be-detected system by using the trigger signal, and generating the plurality of modulation signal sets varying in modulation phase corresponding to the plurality of triggering moments.

3. The single-sideband phase-sensitive detection method of claim 1, wherein step (1) comprises:

performing timing control on a trigger signal of the time-dependent target signal and the plurality of modulation signal sets so that the plurality of modulation signal sets have different modulation phases at individual triggering moments of the trigger signal; and repeatedly triggering the time-dependent target signal of the to-be-detected system by using the trigger signal.

4. The single-sideband phase-sensitive detection method of claim 1, wherein step (3) comprises:

performing high-pass filtering on the plurality of detection signal sets to obtain a plurality of filtered signal sets; and performing Hilbert transform on the plurality of filtered signal sets to obtain a plurality of transformed signal sets, and subjecting the plurality of filtered signal sets to grouped superposition with the plurality of transformed signal sets to obtain the plurality of equivalent single-sideband modulation signal sets.

5. The single-sideband phase-sensitive detection method of claim 4, wherein step (3) further comprises:

in a case where a signal bandwidth of the time-dependent target signal is less than twice a modulation frequency, determining the plurality of filtered signal sets as the plurality of equivalent single-sideband modulation signal sets, wherein the modulation frequency is a reference frequency of each of the plurality of modulation signal sets.

6. The single-sideband phase-sensitive detection method of claim 5, wherein step (4) comprises:

acquiring a demodulation signal;

performing single-sideband demodulation on the plurality of equivalent single-sideband modulation signal sets based on the demodulation signal to obtain a plurality of demodulated signal sets; and subjecting the plurality of demodulated signal sets to superposition and averaging to obtain the plurality of processed signal sets.

7. The single-sideband phase-sensitive detection method of claim 6, wherein the step of performing single-sideband demodulation on the plurality of equivalent single-sideband modulation signal sets based on the demodulation signal to obtain the plurality of demodulated signal sets comprises:

performing filtering demodulation on the plurality of equivalent single-sideband modulation signal sets based on the demodulation signal to obtain the plurality of demodulated signal sets; or performing phase shifting demodulation on the plurality of equivalent single-sideband modulation signal sets based on the demodulation signal to obtain the plurality of demodulated signal sets.

8. The single-sideband phase-sensitive detection method of claim 7, wherein the step of performing filtering demodulation on the plurality of equivalent single-sideband modulation signal sets based on the demodulation signal to obtain the plurality of demodulated signal sets comprises:

multiplying each of the plurality of equivalent single-sideband modulation signal sets by the demodulation signal to obtain a plurality of multiplied signal sets; and performing low-pass filtering on the plurality of multiplied signal sets in a sampling direction to obtain the plurality of demodulated signal sets.

9. The single-sideband phase-sensitive detection method of claim 8, wherein the step of performing filtering demodulation on the plurality of equivalent single-sideband modulation signal sets based on the demodulation signal to obtain the plurality of demodulated signal sets further comprises:

in the case where the signal bandwidth of the time-dependent target signal is less than twice the modulation frequency, subjecting the plurality of multiplied signal sets to low-pass filtering in a time axis direction to obtain the plurality of demodulated signal sets.

10. The single-sideband phase-sensitive detection method of claim 7, wherein the step of performing phase shifting demodulation on the plurality of equivalent single-sideband modulation signal sets based on the demodulation signal to obtain the plurality of demodulated signal sets comprises:

multiplying each of the plurality of equivalent single-sideband modulation signal sets by the demodulation signal to obtain a plurality of first signal sets;

performing phase shift on the demodulation signal to obtain a phase-shifted demodulation signal;

performing Hilbert transform on the plurality of equivalent single-sideband modulation signal sets to obtain a plurality of second signal sets;

multiplying the phase-shifted demodulation signal with each of the plurality of second signal sets to obtain a plurality of third signal sets; and superimposing the plurality of first signal sets with the plurality of third signal sets to obtain the plurality of demodulated signal sets.

11. An electronic device, comprising:

at least one processor; and a memory connected to the at least one processor in communication;

wherein the memory is configured to store an instruction executable by the at least one processor; and the at least one processor is configured to execute the instruction to implement the single-sideband phase-sensitive detection method of claim 1.

12. A non-transitory computer-readable storage medium, wherein a computer instruction is stored on the non-transitory computer-readable storage medium; and the computer instruction is configured to be executed by a processor to implement the single-sideband phase-sensitive detection method of claim 1.

13. A computer program product comprising:

a computer program stored in a non-transitory computer readable medium;

wherein the computer program is configured to be executed by a processor to implement the single sideband phase sensitive detection method of claim 1.

14. A single-sideband phase-sensitive detection system, comprising:
- a timing controller;
- a signal collector; and
- a signal processor;
- wherein the timing controller is configured to control a modulation signal or trigger a time-dependent target signal;
- the signal collector is configured to acquire a plurality of detection signal sets varying in time and modulation phase obtained by modulating the time-dependent target signal after repeated triggering through the modulation signal; and
- the signal processor is configured to receive the plurality of detection signal sets acquired by the signal collector, process the plurality of detection signal sets to obtain a plurality of equivalent single-sideband modulation signal sets, and demodulate the plurality of equivalent single-sideband modulation signal sets to obtain a plurality of processed signals.

* * * * *